United States Patent
Clark et al.

(10) Patent No.: US 9,581,298 B2
(45) Date of Patent: Feb. 28, 2017

(54) OVERPRESSURE ABSORPTION MECHANISM FOR FLUID BED PROCESSORS

(71) Applicant: FREUND-VECTOR CORPORATION, Marion, IA (US)

(72) Inventors: James Alan Clark, Marion, IA (US); Nigel P. Wright, Marion, IA (US); Aaron K. Basten, Solon, IA (US)

(73) Assignee: Freund-Vector Corporation, Marion, IA (US)

( * ) Notice: Subject to any disclaimer, the term of this patent is extended or adjusted under 35 U.S.C. 154(b) by 310 days.

(21) Appl. No.: 13/935,013

(22) Filed: Jul. 3, 2013

(65) Prior Publication Data

US 2015/0007894 A1 Jan. 8, 2015

(51) Int. Cl.
*A47G 19/22* (2006.01)
*F17D 5/00* (2006.01)
*B01J 8/18* (2006.01)
*B01J 2/16* (2006.01)

(52) U.S. Cl.
CPC .... *F17D 5/00* (2013.01); *B01J 2/16* (2013.01); *B01J 8/1809* (2013.01); *B01J 8/1872* (2013.01); *Y10T 137/0396* (2015.04)

(58) Field of Classification Search
CPC .... B65D 88/005; B65D 90/32; B65D 90/325; B65D 90/38; F17B 1/00; F17B 1/007; F24D 3/1008; F16L 55/05
USPC ........................................ 220/720, 721, 722
See application file for complete search history.

(56) References Cited

U.S. PATENT DOCUMENTS

| 20,988 A * | 7/1858 | Burtis ....................... F17B 1/00 48/177 |
| 1,894,536 A * | 1/1933 | Laird ...................... F17B 1/007 48/176 |
| 4,961,705 A | 10/1990 | Schulz et al. |
| 6,880,578 B2 * | 4/2005 | Lin ....................... F16L 55/053 138/26 |
| 7,077,282 B2 | 7/2006 | Tondar et al. |

FOREIGN PATENT DOCUMENTS

| GB | 1182388 | 2/1970 |
| JP | 2621872 B2 | 4/1997 |

OTHER PUBLICATIONS

JP 2621872 (B2); JP1027629(A), Okawara Mfg et al.—English Abstract Translation.

* cited by examiner

*Primary Examiner* — Jeffrey Allen
(74) *Attorney, Agent, or Firm* — McKee, Voorhees & Sease, PLC

(57) ABSTRACT

An overpressure absorption mechanism is provided for a fluid bed processor. The mechanism includes spring assemblies mounted in the legs of the processor. The arms of the lower housing section extend into the legs and are supported on the springs. If an overpressure condition arises within the processor, the springs compress to allow movement between the housing sections to allow engagement of clamping rings which contain the over pressure condition.

9 Claims, 5 Drawing Sheets

OVERPRESSURE ABSORPTION MECHANISM FOR FLUID BED PROCESSORS

BACKGROUND OF THE INVENTION

Fluid bed processors are used for coating, granulating, and drying various types of particles, such as pharmaceuticals, powders, seeds, pellets, and the like. The processor has sections which can be separated for loading and unloading particles and for cleaning, with the sections being sealed together during processing. With some particles, there is a risk of explosion during the processing, creating an overpressure which must be contained within the container. For example, some conventional fluid bed processors have a 12 bar construction and utilize clamp rings at the joints or separation points between the housing sections, so as to be able to withstand an internal pressure of 12 bars. By design, there is clearance between the clamp rings and their associated seal rings to allow for separation of the container sections. The clamp rings allow the housing sections to contain the pressure and separation forces within the container itself during a 12 bar explosion, though the housings may be damaged during such an explosion. However, to engage the clamp rings with their associated seal rings some movement of the container sections must occur.

Therefore, there is a need for a better mechanism or system for allowing movement within the fluid bed processor.

Accordingly, a primary objective of the present invention is the provision of an improved movement mechanism for use in a fluid bed processor.

Another objective of the present invention is the provision of a fluid bed processor having a plurality of springs to allow movement in the processor.

Another objective of the present invention is the provision of a fluid bed processor having a lower housing section mounted on legs, with springs built into the legs to allow movement of the housing sections in the event of an explosion.

Still another objective of the present invention is the provision of an energy absorbing assembly for a fluid bed processor which stores kinetic energy from excessive pressure and restores the kinetic energy to return the container sections to their original positions after the pressure has decreased.

Another objective of the present invention is the provision of an improved method of containing overpressure in a fluid bed processor.

Yet another objective of the present invention is the provision of an energy absorbing assembly which normally biases upper and lower housing sections of a fluid bed processor into sealing engagement, and which allows engagement of the clamp rings to contain the pressure and forces during an explosion in the processor.

These and other objectives will become apparent from the following description of the invention.

SUMMARY OF THE INVENTION

A fluid bed processor is constructed with a movement mechanism which functions during an internal explosion to minimize damage to the processor by allowing clamp rings to engage and contain the forces within the container. The processor has upper and lower housing sections which are normally joined, yet separable from one another for loading and unloading the processor, and for cleaning and maintenance purposes. The lower housing is mounted on legs, each of which includes a spring. The springs support arms extending between each leg and the lower housing section of the processor. These springs form an energy absorbing assembly which absorbs and stores the kinetic energy from an internal explosion in the processor, and then dissipates the kinetic energy when the explosion pressure is relieved. The spring assembly normally biases the lower and middle housing sections into engagement with the upper housing section.

DETAILED DESCRIPTION OF THE PREFERRED EMBODIMENTS

Figure 1:
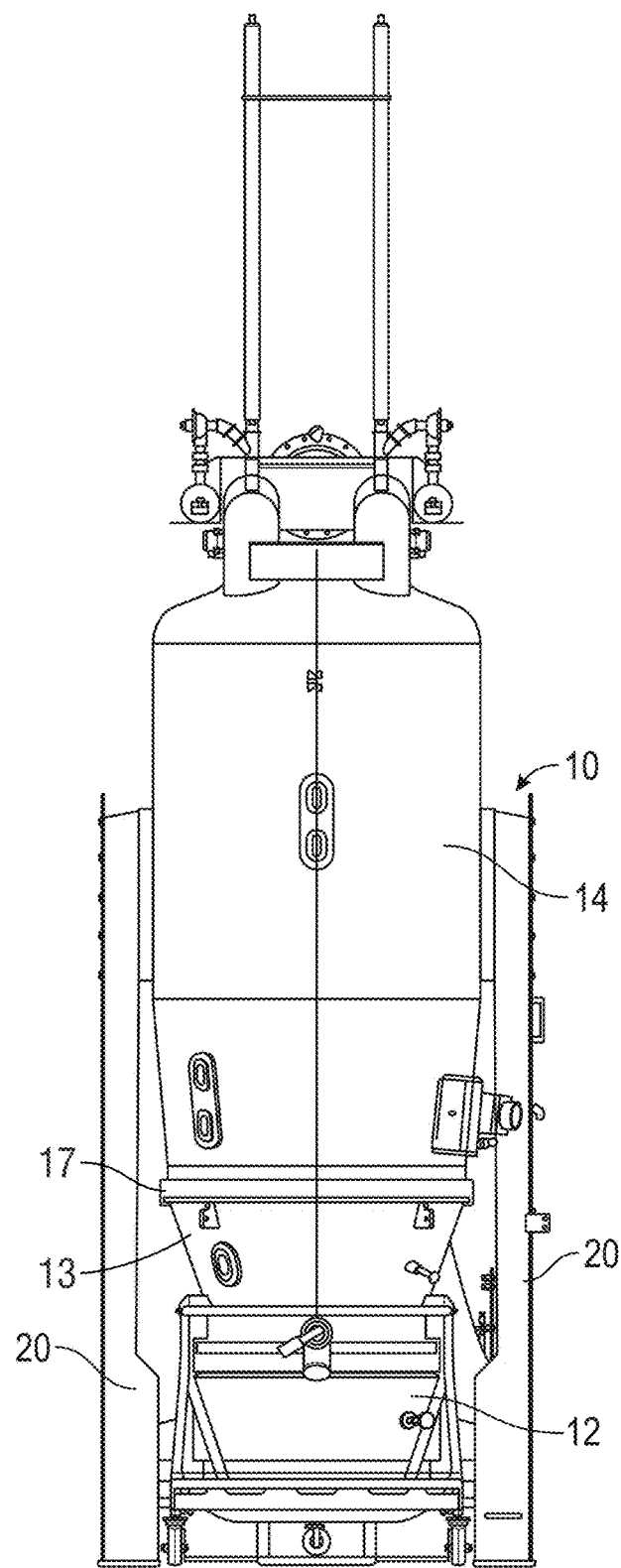
FIG. 1 is a side elevation view of a fluid bed processor having the overpressure absorption mechanism of the present invention.
Figure 2:
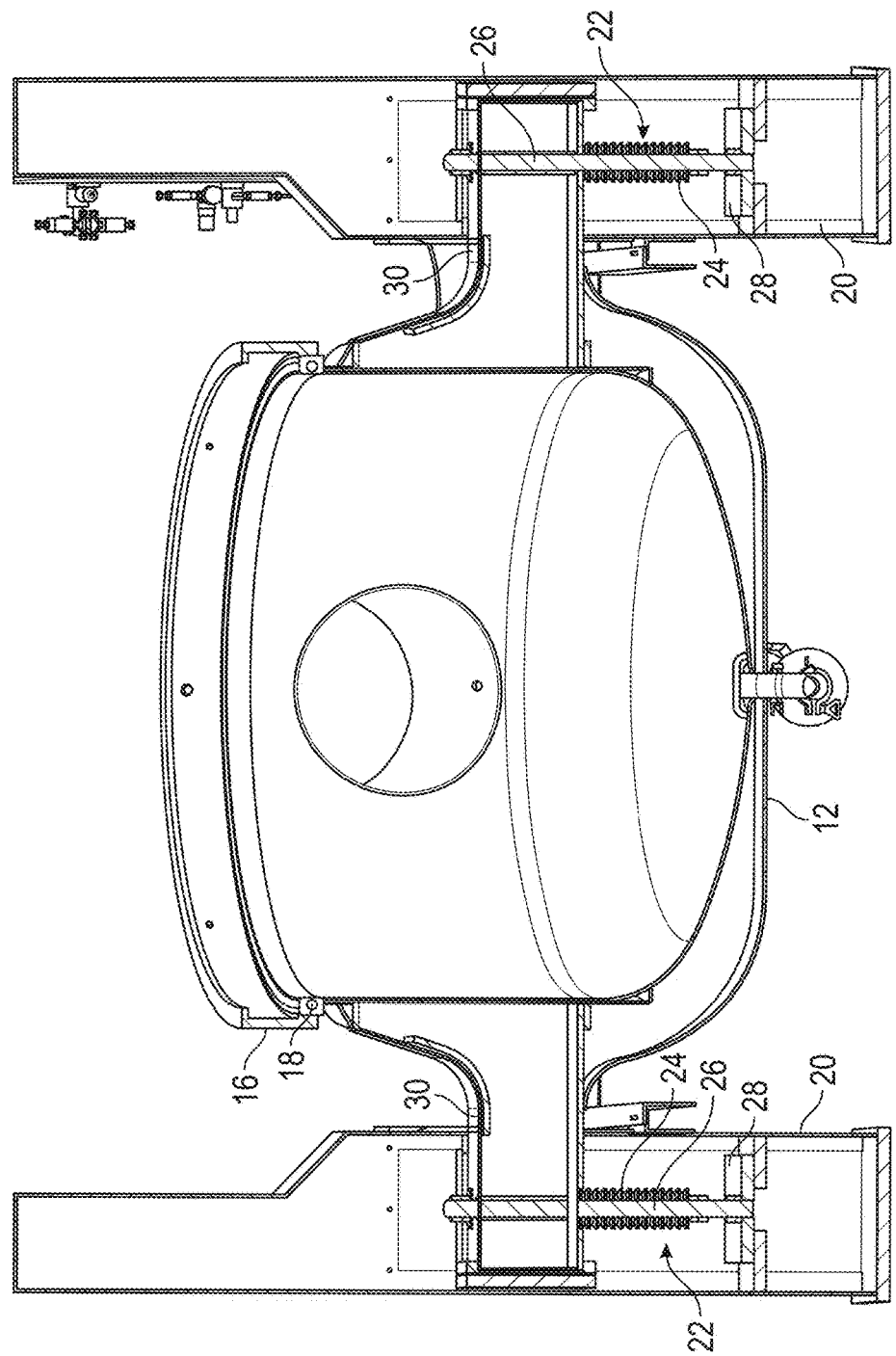
FIG. 2 is a sectional view of the lower housing section of the processor and support legs.
Figure 3:
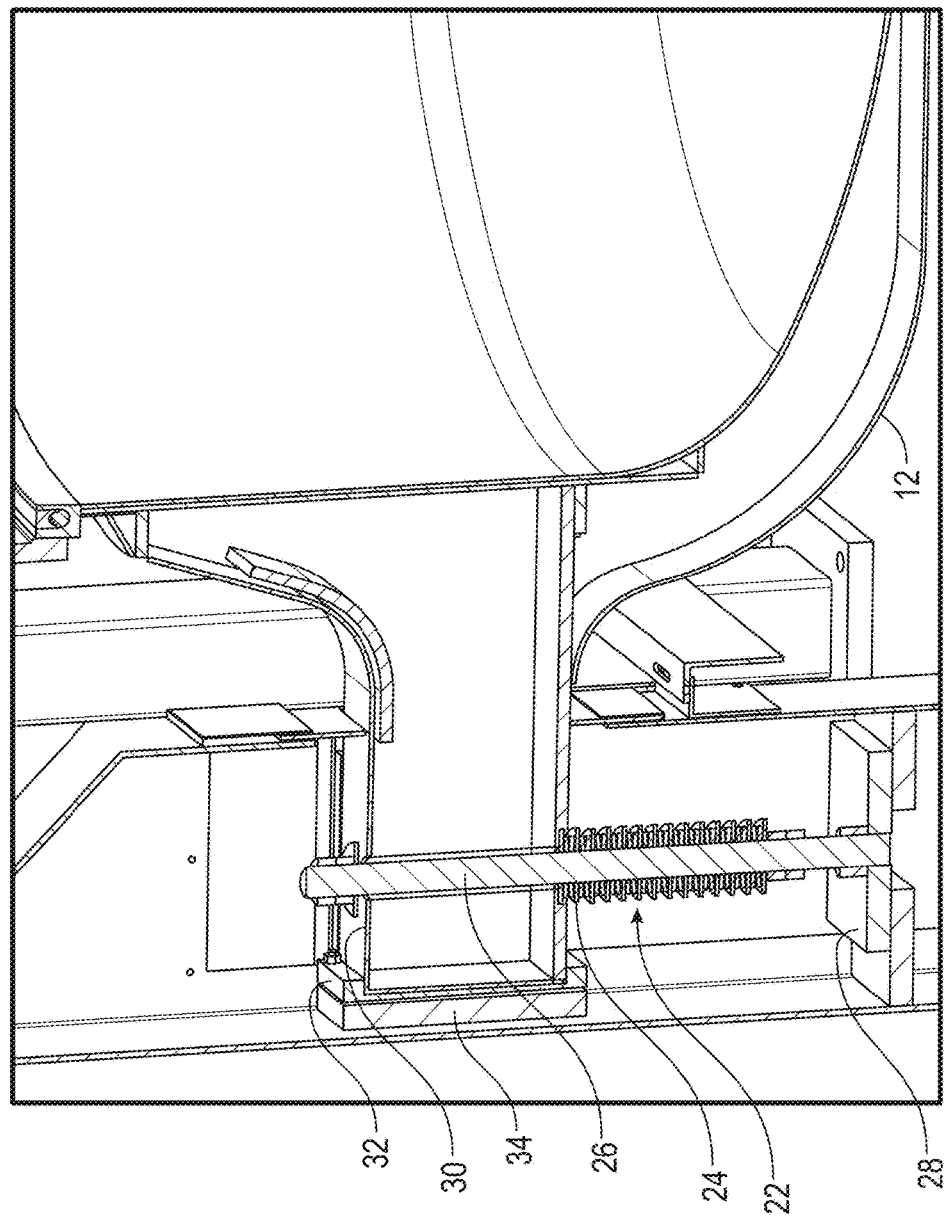
FIG. 3 is an enlarged sectional view of the left leg shown in FIG. 2.
Figure 4:
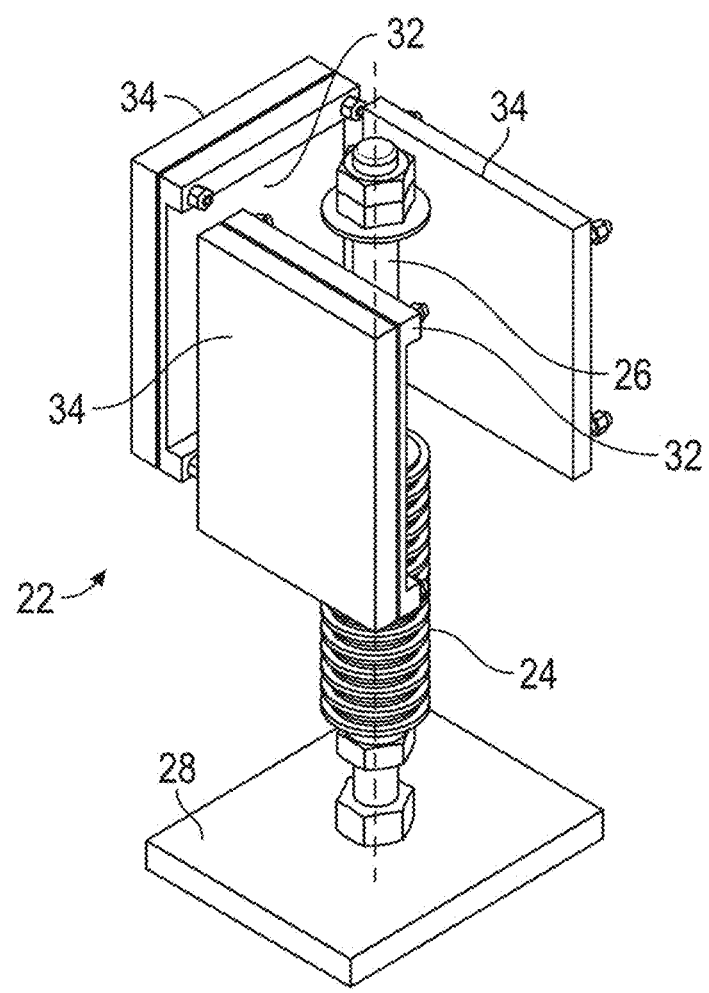
FIG. 4 is a perspective view of one of the spring assemblies within a leg of the processor.

A fluid bed processor is generally designated by the reference numeral 10 in FIG. 1. The processor 10 includes a lower housing section 12, a product containing section 13 and an upper housing section 14, which are joint or coupled together to form the container for the processing chamber and expansion chamber of the processor 10. A ring 16 extends around the juncture of the lower and middle housings 12, 13, with a seal 18 extending along the perimeter edge of the lower housing 12, as best seen in FIG. 2. A similar ring 17 and seal arrangement is formed along with the perimeter edge of the middle and upper housings 13, 14. The lower housing 12 and upper housing 14 are supported by a plurality of legs 20.

The present invention is directed towards a movement mechanism 22 for the processor 10. The movement mechanism 22 is an energy absorbing assembly comprised of spring(s) 24, with one spring assembly mounted in each of the legs 20. The springs are shown to be Belleville washers, though other types of springs may be used.

Each spring 24 is mounted on a post 26. The post 26 extends upwardly from a base plate 28 secured in the leg 20. The upper end of the post 26 extends through an arm 30 extending from the lower housing section 12 and into the leg 20 via an opening in the leg.

The end of the arm 30 is received in one or more jack plates 32. Spacer plates 34 may be provided between the jack plates 32 and the inside wall of the leg 20. Thus, the arms 30 are supported by the springs 24.

In operation, the springs 24 normally bias the lower housing section 12 upwardly into sealing engagement with the middle housing section 13. If an overpressure situation arises within the processor 10, such as from an internal explosion, the springs 24 allow the lower housing section 12 to move downwardly so as to engage the clamp rings between upper, middle and lower housing sections and thereby containing the pressure and forces within the processor 10. The springs 24 absorb the overpressure kinetic energy, which then dissipates as the internal processor pressure is relieved. Preferably, the processor 10 has a 12 bar construction, such that the springs 24 will compress if the internal processor pressure exceeds the force required to maintain the normal operating condition. However, it is understood that the processor 10 can be designed for greater or lesser internal pressures, as desired.

Figure 5:
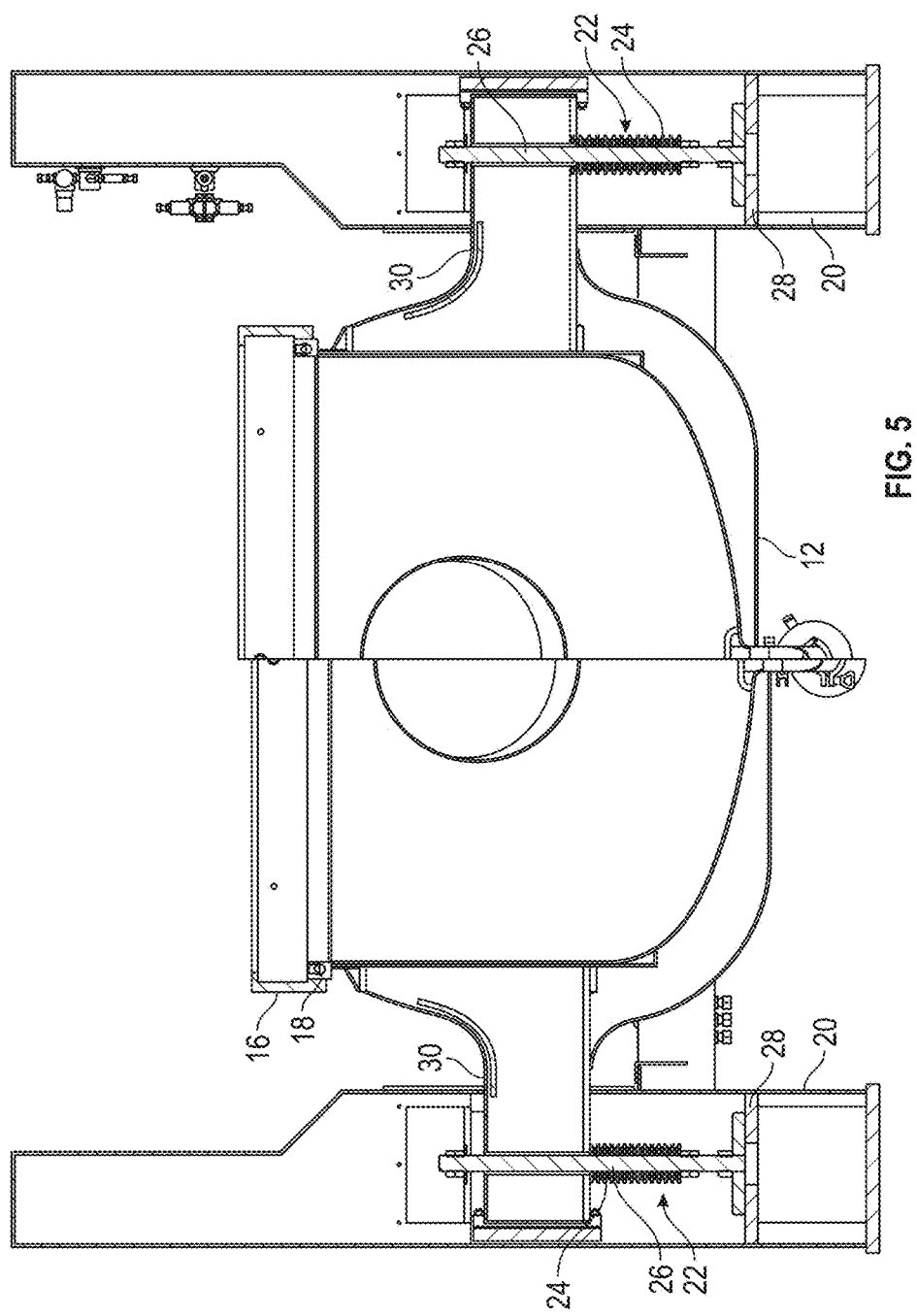
FIG. 5 is a comparative drawing showing the lower housing position with the spring in a compressed state in response to an overpressure condition within the processor on the left, and showing the lower housing with the spring in a normal operating condition on the right.

FIG. 5 shows a side-by-side comparison of the lower housing 12 in its normal operating position on the right side of the figure, and the lower housing 12 in a separated position during an explosion or over pressure event on the left side of the figure. On the right, the spring 24 is extended and the lower housing is raised in sealing engagement with the middle housing. On the left, the spring 24 is compressed and the lower housing 12 is dropped or expanded from the middle housing, so as to engage the clamp rings in the processor 10.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A fluidized bed processor for coating and granulating particulate material, comprising:
   a housing having multiple sections coupled together by a clamp ring to form a coating chamber for coating the particulate material, and for expandable separation relative to one another in the event of excessive pressure with the chamber;
   the sections being separable for loading and unloading the particulate material;
   an energy absorbing assembly supporting one of the housing sections so as to store kinetic energy from excessive pressure in the chamber and to dissipate the kinetic energy after the excessive pressure has decreased.

2. The fluidized bed processor of claim 1 wherein a first one of the housing sections is supported on a plurality of legs, and the energy absorbing assembly includes a spring assembly in each of the legs.

3. The fluidized bed processor of claim 2 wherein the first of the one housing section has arms extending through slots in the legs and being connected to the springs.

4. The fluidized bed processor of claim 3 wherein each spring assembly is mounted on a post secured in the leg.

5. The fluidized bed processor of claim 4 wherein the post is vertically oriented.

6. The fluidized bed processor of claim 4 wherein the post extends through the housing arm.

7. The fluidized bed processor of claim 1 wherein the energy absorption assembly has a capacity up to 12 bars.

8. The fluidized bed processor of claim 1 wherein the energy absorbing assembly normally biases the housing sections together.

9. The fluidized bed processor of claim 8 further comprising a seal between the housing sections.

\* \* \* \* \*